United States Patent Office 3,102,911
Patented Sept. 3, 1963

3,102,911
PROCESS FOR PREPARING B,B',B''-TRIS(ORGANO-AMINO)-N,N',N''-TRIORGANOBORAZINES
Elmer H. Dobratz, Pittsburgh, Pa., assignor to Koppers Company, Inc., a corporation of Delaware
No Drawing. Filed Oct. 16, 1959, Ser. No. 846,771
6 Claims. (Cl. 260—551)

This invention relates to the preparation of complex organic boron-containing compounds. In one specific aspect, it relates to the preparation of hexa-substituted borazines, in particular the useful B,B'B''-tris(organo-amino)-N,N'N''-triorganoborazines.

It is well known that the operation of spark ignition internal combustion engines is improved by the presence of boron in the combustion chamber of the engine. Conventionally, boron is introduced into the engine by adding to gasoline complex organic boron compounds in small amounts, e.g. from about 0.005 to about 1.0 gram of boron per gallon of gasoline.

It has recently been discovered that substituted borazines are quite effective as gasoline additives. Ordinarily, the desirable amino borazines are prepared by the reaction of a boron hydride or halide with an amine. The resulting products can be converted to B-organo borazines by a Grignard reaction such as that described in Scott, U.S. Patent 2,821,463. Unfortunately, the conventional processes are high in cost because they require as starting materials the relatively expensive boron hydrides and halides and in all cases a multi-step process is necessary to obtain the desired borazine.

It was heretofore believed by workers in the art that ammonia or amines did not react with organic borates other than to form unstable adducts or complexes. See Urs and Gould, J. Am. Chem. Soc. 74, 2948 (1952). Quite surprisingly, I have found that under carefully controlled conditions such borates will react with primary amines to produce, in one step, the desirable gasoline additives, the B,B'B''-tris(organo-amino)-N,N'N''-triorgano-borazines. My process has considerable advantage over those of the prior art in that it utilizes less expensive and readily available starting materials, i.e. the organic borates, and it requires only one step to make the desired borazine.

It is, therefore, an object of the present invention to provide a one-step process for the synthesis of organo-amino-substituted borazines which are useful as fuel additives.

In accordance with the invention a primary amine is reacted with a borate ester selected from the group consisting of the borate esters of phenols, alkanols and cycloalkanols to form as reaction products a borazine and an alcohol. The alcohol is removed from the reaction mixture as the reaction progresses and the desired organo-amino borazine is recovered from the reaction mixture.

Before explaining in detail the range of reaction conditions applicable to the invention, I find it appropriate to discuss the probable reaction mechanism by which my results are obtained. Because of the complex nature of the system I do not maintain that the suggested mechanism is the only possibility or that the exact reaction sequence is that given, but the operation of my process is logically explained thereby.

The overall equation for the reaction can be written as follows:

(1) $6R'NH_2 + 3(RO)_3B \longrightarrow$ 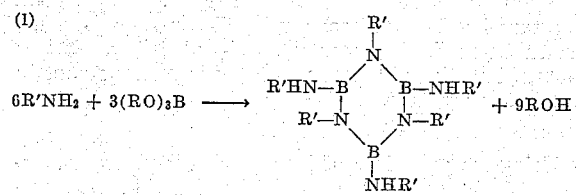 $+ 9ROH$

In the above equation, and in the equations that follow, R and R' are alkyl, cycloalkyl or aryl radicals. The reaction sequence hereunder is believed to show the path of the reaction.

(2) $(RO)_3B + R'NH_2 \rightarrow (RO)_2B\text{—}NHR' + ROH$
(3) $(RO)_2B\text{—}NHR' + R'NH_2 \rightarrow ROB(NHR')_2 + ROH$
(4) $ROB(NHR')_2 + (RO)_3B \rightarrow$
$\quad\quad ROB(NHR')NR'B(OR)_2 + ROH$
(5) $ROB(NHR')NR'B(OR)_2 + R'NH_2 \rightarrow$
$\quad\quad ROB(NHR')NR'B(OR)NHR' + ROH$
(6) $ROB(NHR')NR'B(OR)NHR' + (RO)_3B \rightarrow$
$\quad\quad ROB(NHR')NR'B(OR)NR'B(OR)_2 + ROH$ (7) $ROB(NHR')NR'B(OR)NR'B(OR)_2 \longrightarrow$

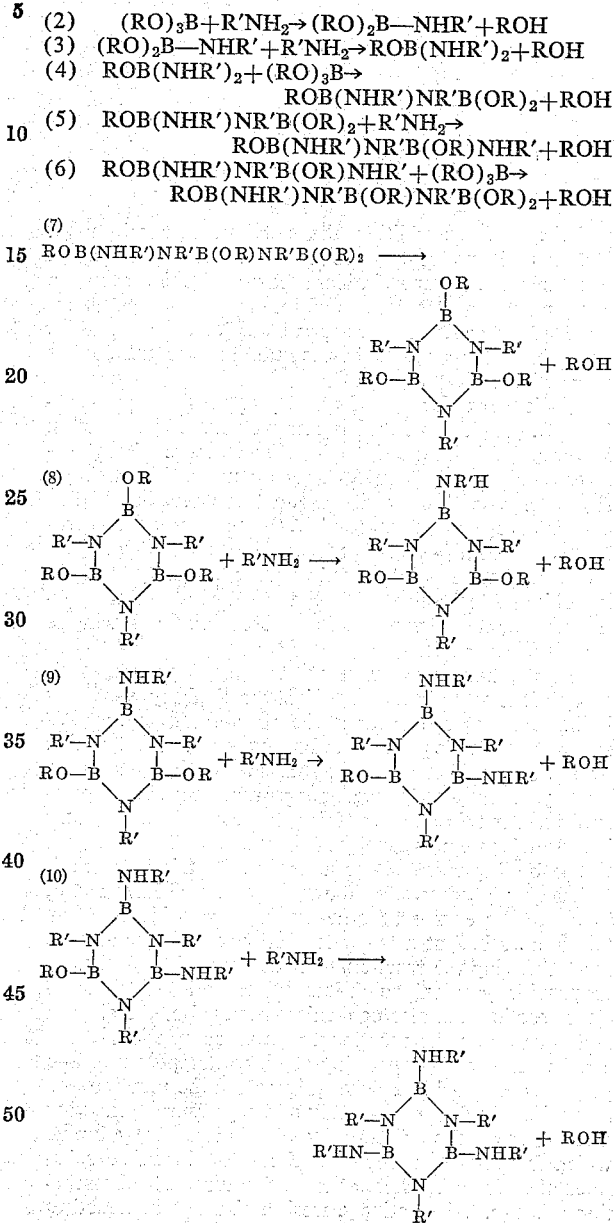

I have found that the reactions shown hereabove are equilibrium reactions and, accordingly, to make the desired borazines by my method, it is essential to remove the alcohol as the reaction progresses. Although it is desirable to separate the alcohol as soon as it is formed, it is not necessary to provide for continuous removal. I have found it convenient simply to distill off the alcohol in intermediate stages during the reaction.

The choice of the starting primary amine for my novel process varies widely. Useful amines include alkyl amines such as methyl amine, ethyl amine, isopropyl amine, n-butyl amine, amyl amine; cycloalkyl amines such as cyclohexyl amine; and aryl amines such as aniline; o-, m- and p-toluidine, o- and p-anisidine, and the like. Amines such as ethanolamine, 3-methoxypropylamine, sodium glycinate, dodecylamine, 3-methylcyclopentylamine, cycloheptylmethylamine, 4-chlorobenzylamine, 2-(2-nitrophenyl)ethylamine, 4-aminobiphenyl, β-naphthylamine and abietylamine are also useful.

The varity of organic borates useful in my process is also extensive. For example, suitable borates include trimethyl borate, triethyl borate, triisopropyl borate, triisobutyl borate, tricyclohexyl borate, triphenyl borate, tricresyl borate, 2-methoxy-2-boradioxolane

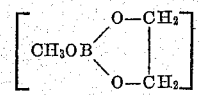

2-phenoxy-2-bora-1,3-dioxane

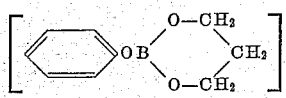

and the like. In addition, the metaborates can be used, e.g. methylmetaborate, also called trimethoxyboroxine, but their use is undesirable because of side reactions. Mixtures of organic borates and metaborates such as are obtained on dissolving less than stoichiometric quantities of $B_2O_3$ in an organic borate are likewise usable but unadvantageous.

Incipient reaction occurs at temperatures as low as 50–100° C. As the alcohol is removed from the reaction mixture the boiling point of the mass rises. Temperatures as high as 350–400° C. can be used without excessive decomposition of the products or reactants. For convenience, I prefer to conduct the reaction at temperatures between about 75–315° C. The choice of the reaction temperature is influenced to some extent by the boiling point of the amine selected as a reactant and the particular alcohol formed during the reaction, as will be explained hereafter.

The reaction works well at atmospheric pressure, although it is sometimes convenient, particularly when low boiling amines are used as the reactant, to operate at super-atmospheric pressures. Pressures up to 2,000 p.s.i.g. or more can be conveniently used. When pressure is employed, the use of autogenous pressure, that is, the pressure resulting from maintaining the desired temperature in a closed system, is usually adequate.

The boiling point of the amine reactant is not a limitation on my process, although it does, as I have noted, influence the choice of other reaction conditions. Certain amines boil at a lower temperature than the alcohol formed during the reaction. In such cases it is necessary to provide physical conditions which will permit sufficient reaction and also convenient removal of the alcohol and thus allow the reaction to go to completion. This can be achieved by operating at higher temperatures and pressures to provide a driving force for the reaction and intermittently (or continuously under pressure) removing alcohol from the mixture by distillation. Any amine which is removed along with the alcohol can be separated therefrom by distillation and returned to the reaction mixture. Alternatively, fresh amine can be added to the system to replenish that taken off during the removal of the alcohol. It is also possible to initiate reaction between the organic borate and a portion of the stoichiometric requirement of the amine by contacting the two materials in the vapor phase at a high temperature, e.g. 100–400° C., condensing the products thus formed and adding more amine to complete the reaction. Alcohol can be separated during the condensation step and also as the reaction progresses after the additional amine has been added. Recycle or addition of fresh amine can be conducted as described hereabove.

The mole ratio of the reactants is governed by practical rather than theoretical considerations. Theoretically, two moles of amine are required per mole of organic borate in order to convert all of the borate into the desired organo-amino borazine. If only one mole of amine is used the intermediate alkoxy borazine can be obtained (Equations 2–7). Above 200–300° C. certain intermediates apparently interreact at an appreciable rate to liberate alkyl borate and the organo-amino borazine. Any excess alkyl borate in the final reaction mixture can be recovered for reuse. To make the amino borazines, it is preferred to use at least the stoichiometric amount of amine required and a slight excess is usually helpful.

The use of a solvent is not required, but it is sometimes helpful in providing a higher reaction temperature for low boiling reactants. Any inert solvent, that is, one which does not react with either the products or reactants, can be used. Suitable solvents include xylene, diethylcyclohexane, toluene, and the like. Saturated hydrocarbons are also useful.

My invention is further illustrated by the following examples.

*Example I*

To a flask equipped with an agitator, thermometer and fractionating column was charged 245 g. (1.677 moles) of triethyl borate and 377 g. (3.4 moles) of cyclohexylamine. The reaction mixture was heated to boiling, 126° C., and over a period of 40 hours 214 g. of distillate, primarily ethyl alcohol boiling at 78–82° C., was slowly fractionated therefrom. During this time the reaction temperature rose from 126° C. to 217° C. The pressure was then reduced and 58.5 g. of material boiling at 42° C. at 19 mm. and 15 g. of material boiling at 112–118° C. at 1 mm. was distilled from the reaction mass. Approximately 18 g. of liquid was collected in a liquid nitrogen-cooled trap. The fractionating column was then removed and 167 g. of material boiling at 186–202° C. at about 1.8 mm. was distilled from the reaction mass. It crystallized on cooling. In the reaction vessel there remained about 135 g. of a black resinous material. The crystalline distillate exhibited a strong infrared absorption band at 6.75–6.80 microns, indicating the borazine ring, and other bands at 2.92, 6.9 and 7.5–9 microns, indicative of the NH and cyclohexyl groups. The analysis for the B,B′,B″-tri(cyclohexyl amino)-N,N′,N″-tricyclohexyl borazine is:

| | Calcd. for $C_{36}H_{69}N_6B_3$ | Found |
|---|---|---|
| C | 69.91 | 71.5 |
| H | 11.25 | 12.0 |
| N | 13.59 | 13.4 |
| B | 5.25 | 4.2 |

*Example II*

To a one liter flask equipped with an agitator, thermometer, feed funnel and fractionating column was charged 231.6 g. (1.583 moles) of substantially anhydrous triethyl borate. The stirred triethyl borate was heated to boiling (118.5° C.) and over a period of 10 hours 157 g. (1.583 moles) of essentially anhydrous cyclohexylamine was added thereto. Soon after the addition of cyclohexylamine was started, distillate (ethyl alcohol), boiling at 77–81° C., appeared in the still head and was collected in a receiver. As alcohol was removed the reaction temperature rose from 118.5° C. to 134° C. After the addition was completed, heating was continued for an additional 23 hours, during which time the reaction temperature rose to 194° C. At this point a total of 122.4 g. of distillate, primarily alcohol boiling at 78–81° C., was collected. The vapor temperature then suddenly rose to 118.5° C. and 94 g. of distillate, essentially pure triethyl borate, was collected over a period of an hour and the reaction temperature had risen to 315° C. At this point the experiment was discontinued. The reaction residue, which crystallized on cooling, weighed 161 g. It was shown, by infrared analysis as in Example I, to contain the desired borazine.

*Example III*

Using the procedure of Example I 1.7 moles of tri-n-propyl borate was substituted for the triethyl borate therein utilized. The product obtained was identical with that of Example I, as shown by infrared analysis.

Example IV

To the equipment described in Example I was charged 349 g. of tri-n-propyl borate which was heated under reflux conditions (176° C.). Over a period of 20 hours 344 g. of aniline was fed to the reaction vessel from an additional funnel. During the addition the reaction temperature rose to 202° C. and 163 g. of distillate boiling at 97–100° C. was obtained. Heating was continued for an additional 6 hours during which time the reaction temperature rose to 270° C. and 15 g. more distillate was obtained. The total distillate by refractionation was shown to be essentially pure n-propyl alcohol, B.P. 96–97° C. at 745 mm. of Hg. The reaction residue, which crystallized on cooling, weighed 300 g. A small sample was recrystallized from diglyme (dimethoxydiethylene glycol) to give crystals melting at 171–173° C. The nitrogen and boron contents of the crystals were determined. The analysis for B,B',B''-tris(phenylamino)-N,N',N''-triphenylborazine is:

|   | Calcd. for $C_{36}H_{33}N_6B_3$ | Found |
|---|---|---|
| N | 14.43 | 14.47 |
| B | 5.58 | 5.2 |

Example V

A 500 ml. flask, equipped with a thermometer and fractionating column, was purged with nitrogen and maintained under a slight positive nitrogen pressure by means of a mercury relief trap to prevent entrance of moisture. To the flask was then charged 130.2 g. (1.25 moles) of trimethyl borate and 184.7 g. (2.52 moles) of n-butylamine. Upon adding the amine to the borate a temperature rise of 23° C. was observed. The mixture was then heated to boiling, 73° C., and the methyl borate-methyl alcohol azeotrope, boiling at 54.5° C. was slowly fractionated from it. Over a period of 11 hours 100 g. of azeotrope was obtained and the reaction temperature had risen to 80° C. Distillation was continued an additional 11 hours and another 185 g. of distillate boiling at 57–75° C. was collected. The reaction temperature had risen to 229° C. The experiment was terminated. There remained in the reaction vessel 22.5 g. of a very viscous liquid. Infrared and mass spectra indicated it to be B,B',B''-tris(n-butylamino)-N,N',N''-tri-n-butylborazine. The mass spectrograph analysis showed the presence of about 5 mole percent of methoxyborazene, probably a mixture of B-methoxy-B'B''-bis(n-butylamino)-N,N',N''-n-butylborazine, B,B'-bis(methoxy)-B''-n-butylamino-N,N',N''-n-butylborazine and B,B',B''-tris(methoxy)-N,N',N''-n-butylborazine.

I claim:
1. Method of making an aminoborazine characterized by the formula:

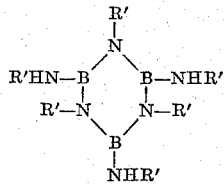

wherein R' is a member selected from the group consisting of lower alkyl, cycloalkyl, phenyl, tolyl and methoxy phenyl comprising reacting at a temperature of about 50–400° C., a primary amine selected from the group consisting of lower alkylamine, cycloalkylamine, and monocyclic arylamine of the formula

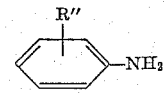

wherein R'' is a member selected from the group consisting of methyl, methoxy and hydrogen, with a borate ester of the formula $(RO)_3B$, wherein R is a member selected from the group consisting of lower alkyl, cycloalkyl, phenyl, and cresyl, the mole ratio of said primary amine to said borate ester being at least 2:1, to form as reaction product, said aminoborazine and an alcohol of the formula ROH wherein R is defined as aforesaid, and removing said alcohol from the reaction mixture by distillation as the reaction progresses.

2. Method of making an aminoborazine characterized by the formula:

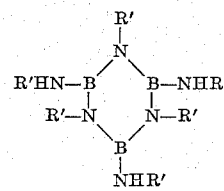

wherein R' is lower alkyl, comprising reacting at a temperature of 50–400° C. primary lower alkylamine with tri-lower alkylborate to form, as reaction products, said aminoborazine and lower alkanol, removing said alkanol from the reaction mixture by distillation as the reaction progresses, and recovering said aminoborazine from the residue.

3. Method of making B,B'B''-tris(cyclohexylamino)-N,N',N''-tricyclohexyl borazine comprising reacting cyclohexylamine with tri-lower alkylborate at a temperature of 75–315° C. to form, as reaction products, said borazine and lower alkanol, and removing said alkanol from the reaction mixture by distillation as the reaction progresses.

4. Method of making B,B',B''-tris(phenylamino)-N,N',N''-triphenyl borazine comprising reacting aniline with tri-lower alkylborate at a temperature of 75–315° C. to form as reaction products, said borazine and lower alkanol, removing said alkanol from the reaction mixture by distillation as the reaction progresses, and recovering said borazine from the residue.

5. Method of making B,B',B''-tris(butylamino)-N,N',N''-tributyl borazine comprising reacting butylamine with tri-lower alkylborate at a temperature of 70–315° C. to form, as reaction products, said borazine and lower alkanol, removing said alkanol from the reaction mixture by distillation as the reaction progresses, and recovering said borazine from the residue.

6. The method of producing aminoborazine which comprises heating to boiling temperature one mole of tri-lower alkylborate with two moles of primary cycloalkylamine.

References Cited in the file of this patent

Goubeau: Zeitschrift für Anorganische und Allgemeine Chemie, volume 266, 164 (1951).

Goubeau: Zeitschrift für Anorganische und Allgemeine Chemie, volume 268, page 146 (1952).

Urs et al.: Journal of the American Chemical Society, volume 74 page 2948 (1952).

Noller: Chemistry of Organic Compounds (textbook); second edition (1957), pages 233–241, W. B. Saunders Co.